Jan. 20, 1959 W. S. BUNNELL 2,869,402
DEEP DRILLING ATTACHMENT
Filed Sept. 30, 1954
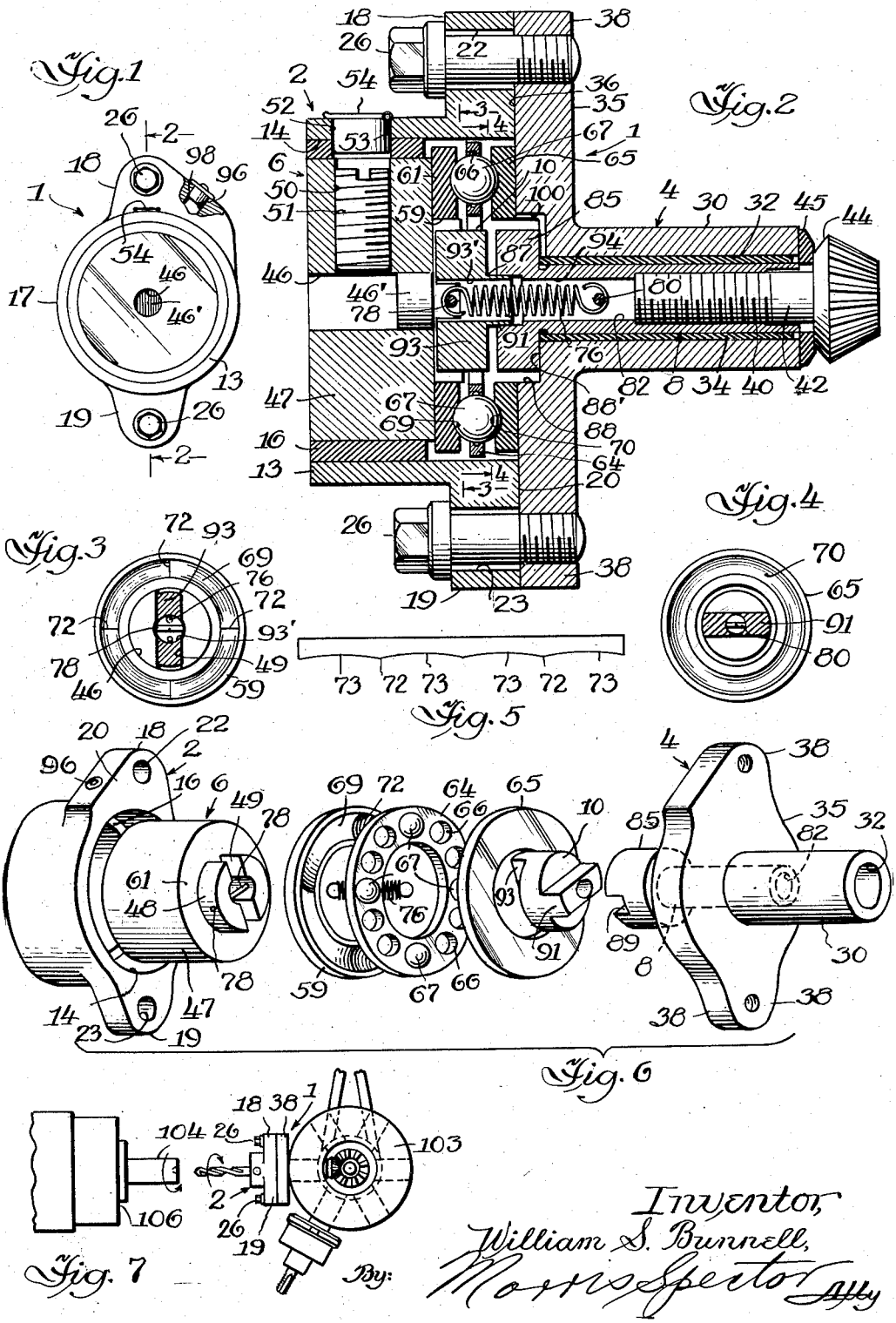
Inventor,
William S. Bunnell,
By: Morris Spector Atty

United States Patent Office 2,869,402
Patented Jan. 20, 1959

2,869,402

DEEP DRILLING ATTACHMENT

William S. Bunnell, Chicago, Ill., assignor to Boyar-Schultz Corporation, Chicago, Ill., a corporation of Illinois Application September 30, 1954, Serial No. 459,287

1 Claim. (Cl. 77—32.3)

This invention relates to machine tools, and more particularly relates to a drilling attachment for an automatic screw machine, a turret lathe, and other like machines which revolve the work that is being drilled.

The present invention relates to an improvement on a deep drilling attachment of the type shown in my Patent No. 2,645,952, the improvement so altering the construction of the drilling attachment that the reciprocating drill also rotates, so that the speed of relative movement of the drill with respect to the work is a function of the sum (or difference) of the speed of the work and the speed of the drill.

It is a further object of the present invention to provide a reciprocating or chip breaking drilling attachment wherein the drill is rotated and wherein the construction is such that the frequency of reciprocations per revolution of the drill may be easily altered.

In automatic screw machines of the turret type the turrets are usually provided with a number of stations, six of such stations being typical, and the turret is indexed around automatically to bring the different tools successively into position to work on the revolving work piece. When the deep drill attachment is to be rotated as well as reciprocated, it is important not to complicate the attachment unduly so as to increase its size to a point where it may not be used with a standard type of turret. It is therefore an object of the invention to provide a deep drilling attachment which is both rotatable and reciprocable and which is sufficiently compact to be received within a standard size mounting bore of a turret, and which will not project beyond the required space limitations demanded by the turret.

Another object of the invention is to provide a simple and compact deep drilling tool having a drive shaft and a driven rotatable and reciprocable drill holder, which have axes of rotations which may be spaced in adjustably varying amounts from each other so as to align a drill quickly and easily with the axis of rotation of the work. The center line of the drill often gets out of line with the center line of the work piece holding portion of the machine due to the wearing of the relatively moving engaging parts of the machine or for other reasons. The misalignment of the drill and work piece is harmful particularly where small holes are to be drilled to close tolerances.

The structure by which the aforesaid and other objects and advantages of the present invention are obtained will appear from the following detailed description illustrating one preferred embodiment of the invention.

In the accompanying drawings illustrating such embodiment:

Fig. 1 is an end view of a deep drilling attachment embodying the present invention;

Fig. 2 is a longitudinal sectional view of the drilling attachment, taken along the line 2—2 of Fig. 1 and drawn to an enlarged scale;

Fig. 3 is a fragmentary sectional view of the attachment, taken along the section line 3—3 of Fig. 2 and looking in the direction of the arrows;

Fig. 4 is a fragmentary sectional view of the attachment, taken along the section line 4—4 of Fig. 2 and looking in the direction of the arrows;

Fig. 5 is a development of the cam race;

Fig. 6 is an exploded perspective view of the deep drilling attachment of Figs. 1–4; and Fig. 7 is a diagrammatic view showing the tool holder in position on an automatic screw machine.

Reference may now be had more particularly to the drawings where like reference numerals designate like parts throughout.

A deep drilling attachment of the present invention, indicated at 1, comprises separable front and rear juxtaposed housing sections 2 and 4, respectively, that receive, respectively, a cylindrical tool holder 6 for receiving and holding a drill, and a hollow drive shaft 8 which rotates the tool holder. A coupling 10 couples the drive shaft and the tool holder.

The front housing section 2 constitutes a cylindrical tool head 13 having a central longitudinally extending cylindrical bore 14. A cylindrical bronze bushing 16 is press fitted in the front portion of the bore 14. The tool holder 6 is journalled in the bushing 16. The rear of the tool head or front housing section 2 terminates in oppositely disposed radial ears 18 and 19 that have flat co-planar rear faces 20 which lie in a plane at right angles to the longitudinal axis of the assembly. The ears 18 and 19 have a pair of oversized bolt-receiving holes 22 and 23 that receive bolts 26 for securing the tool head to the rear housing section 4.

The rear housing section 4 has a cylindrical shank 30 having a longitudinal cylindrical bore 32 in which a cylindrical bushing 34 is press fitted. The shaft 8 is journalled in the bushing 34. The front of the shank 30 terminates in a radial flange 35 that has a front planar face 36 at right angles to the longitudinal axis of the bearing 34 and against which the rear face 20 of the front housing bears. The flange 35 has a pair of oppositely disposed radial ears 38 with flat co-planar front faces which are flush with the front face of the rest of the flange. The front housing section 2 and the rear housing section 4 are secured together in adjusted position by the bolts 26 which thread into tapped holes in the rear housing ears, the extent of permissible adjustment being determined by the clearance between the shanks of the bolts 26 and the oversized holes 22 and 23.

The drive shaft 8 has a central longitudinal tapped rear bore 40 in which is threaded the shank 42 of a bevel drive gear 44. The gear 44 bears on a bearing ring 45 between it and the end of the shank 30.

The tool holder 6 has a cylindrical body 47. A tool receiving bore 46 extends longitudinally through the entire body. The rear of the body 47 has a cylindrical neck 48 coaxial with the rest of the body, which neck has a diametrically extending slot 49 therethrough dividing the neck into two similar parts. A tapped bore 50 extends radially through the tool holder body and communicates with the bore 46 and receives a locking screw 51 for locking a tool in the bore 46. A plug 46' is press fitted within the tool-receiving bore 46 just rearward of the transverse bore 48 and closes the inner end of the bore. Access to the slotted head of the screw 51 is obtained through a radial hole 52 extending through the tool head or front housing section 2 and the bushing 16, which hole is in alignment with the bore 50 in one position of rotation of the tool holder. The head of the locking screw 51 is recessed within the outer periphery of the tool holder body 47. To prevent entry of dust into the space between the tool holder and the tool head 2, a sleeve 53 carrying a spring hinged cap 54 is press fitted into the radial hole 52. The cap closes the top of the radial hole 52.

Means is provided to reciprocate the tool holder axially of the attachment. This means includes an annular cam ring 59, a roller bearing cage ring 64, and a bearing ring 65. The cam ring 59 is press fitted over the cylindrical surfaces of the slotted neck 48, and bears against the rear face 61 of the tool holder body. The cam ring 59, the cage ring 64 and the bearing ring 65 are located in the rear portion of the tool head bore 14 beyond the cylindrical bushing 16.

The cage 64 has a number of equally spaced ball bearing receiving holes 66, twelve such holes being shown in the illustrated embodiment. Ball bearings 67 are shown retained in four of these holes which are spaced approximately 90° apart. If an increase in the number of oscillations of the tool holder per revolution thereof is desired, additional ball bearings may be used in the other holes. The ball bearings 67 ride in annular races 69 and 70, respectively, formed in the cam ring 59 and the bearing ring 65. The races 69 and 70 are maintained coaxial with the longitudinal axis of the tool holder.

The axial extent of the walls of the race 69 is varied about the race so as to provide four cam peaks 72 spaced approximately 90° apart and separated by four valleys 73. The walls of the race between the cam peaks 72 are smooth concave surfaces which intersect at the peaks 72. The race 69 thus serves as a cam surface which is engaged by the front faces of the ball bearings 67 to impart axial oscillation to the tool holder 6. In one embodiment of this invention the amplitude of oscillation was 0.008 inch which was obtained by making the peaks 72 that distance above the valleys of the cam.

The tool holder and drive shaft are drawn together by a tension spring 76. One end of the tension spring 76 hooks over a front spring anchoring pin 78 anchored in the tool holder slot 49. The other end of the spring hooks over a rear spring anchoring pin 80 which is anchored in the drive shaft 8 and extends across the bore thereof.

The tool holder 6 and rings 59, 64 and 65 are drawn rearward by the tightening of the bevel gear shank 42 in the threaded bore 40 of the drive shaft. This draws the cam ring 59 toward the balls 67 and the ring 65 solidly against the front face 36 of the rear housing flange 35.

As the tool holder 6 and cam ring 59 rotate, the action of the race 69 on the balls 67 causes the cage ring 64 to rotate in the same direction and at approximately one-half the speed of rotation of the tool holder. Thus, for every revolution of the tool holder, each ball bearing 67 therefore rides over two peaks and two valleys of the walls of the race 69, thus oscillating the tool holder axially two times. The oscillation frequency may be varied by varying the number of cam peaks on the cam race 69 or the number of ball bearings in the cage 64.

Coupling 10 is constructed to permit the drive shaft and the tool holder to rotate about axes which are out of alignment with one another. This coupling engages a cylindrical member 85 secured to the end of the drive shaft 8. The member 85 extends within a cylindrical bore 88 formed in the front face of the rear housing flange 35. A diametrically extending slot 89 is formed across the front face of the member 85 and slidably receives a lug 91 that projects rearwardly from the coupling 10. A lug 93 which extends at right angles to the lug 91 projects forwardly from the coupling 10. The front lug 93 extends within the slot 49 formed in the tool holder neck 48. A longitudinal bore 93' extends through the lugs 91 and 93. The bore 93' opens onto the longitudinal sides of the lug 93 to provide slots (see Fig. 3) through which the anchoring pin 78 freely passes. The slots are sufficiently oversized to permit the lug 93 to slide within the slot 49. It can thus be seen that the coupling 10 couples rotary movement of the drive shaft 8 to the tool holder 6 even though the shaft and holder have axes of rotation displaced from each other.

The inner diameters of the rings 59 and 64 are larger than the outer diameter of the coupling 10 to permit relative lateral movement between the rings and coupling. The inner diameter of the ring 65 is larger than the diameter of the member 85 for the same reason.

The drive shaft 8 has a central longitudinal bore 94 which communicates with the bore 93' in the coupling 10. The tension spring 76 fits loosely within these bores so that there may be relative lateral movement between the spring and the defining walls of these bores.

To facilitate lubrication of the relatively movable parts of the deep drilling attachment 1, a transverse bore 96 is formed in one of the radial ears 18 (see Fig. 1) of the tool head 2, which bore communicates with the longitudinal bore 14 in the tool head. A suitable dust-proof oil receiving fitting 98 is press fitted within the bore 96.

A narrow passageway 100 is formed in the walls of the rear housing flange 35 which passageway communicates with the bore 88 therein. The passageway carries oil from the bore 14 into the space between the drive shaft 8 and the bushing 34.

The attachment is mounted in a turret 103 (Fig. 7) of a turret lathe or automatic screw machine, with the mounting shank 30 of the rear housing section extending into a complementary bore in the turret. The shank 30 is locked securely in place in the turret by any suitable means. A work piece 104 is inserted and locked into a work-holding collet 106 of the machine. If the longitudinal axes of the tool holder and the work are out of line, the bolts 26 of the attachment 1 are loosened so that the tool head 2 may be slid laterally with respect to the rear housing section 4 to the limits of clearance permitted by the space between the shanks of the latter bolts and the oversized holes 22 and 23. In shifting the tool head 2 relative to the housing section 4, the rear face of the tool head is slid along the front face of the rear housing section. During this operation, the tool holder 6, the cam ring 59 and the bearing rings 64 and 65 remain coaxial with each other and move together an amount permitted by the clearance between the rings and the coupling 10 and the member 85. When proper positioning of the tool head is obtained, the bolts 26 are tightened to lock the front and rear housing sections together.

The present invention has thus provided a compact and simply constructed deep drilling tool attachment wherein the tool holder is both rotated and reciprocated so as to effect the aforementioned chip breaking function.

The number of vibrations of the tool holder per revolution thereof is determined by the number of peaks 72 (and valleys) in the cam ring 59 and by the number and distribution of balls in the ball cage 64. Therefore, by changing the ring 59 for one having a different number of peaks and valleys, the frequency of reciprocation per revolution of the tool is changed. The same result can be obtained by changing the number or distribution of the balls in the cage 64. Thus, by tripling the number of balls, placing one in each hole 66 in the race, the number of reciprocations per revolution is tripled. In one form of construction the balls 65 are freely removable and therefore the change in frequency of reciprocations can be effected by merely adding balls to selected vacant ball-receiving holes 66. In another, and preferred, construction the balls are retained in the races as is usual in floating ball bearing constructions. In such case, it is cheaper to provide the tool of Fig. 2 with replacement races carrying different numbers of balls, or balls differently distributed angularly, so that by replacing the cage 64 by a race carrying a different number of balls a different frequency of vibration per revolution of the tool is obtained. It is by far cheaper to provide alternate cages 64 for obtaining such change than it is to provide alternate cam rings 59, either of which may easily be replaced.

In use of the present invention, the work 104 is rotated at a speed required to give the necessary linear velocity for cutting or machining operations that are to be performed on the periphery of the work. The rotary speed required to give the necessary linear speed at the periphery of the work is determined by the diameter of the work. The speed of rotation of the work results in a linear velocity at the place where the work is to be drilled which may be different from the optimum linear velocity at the place where the drilling operation is to take place. The drill is then rotated by the tool holder at a rate such that the sum (or difference) of the velocity of the drill and the velocity of the work at the place where it is being drilled is the maximum amount possible for the particular drilling operation. Any slower speed of the drill with respect to the work results in a slower drilling operation. It is thus apparent that the speed requirement for performing the drilling operation has been made to be independent of the speed requirement for performing the machining operations on the periphery of the work 104.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

Machine tool apparatus for use in drilling machinable material by relative rotary and axial chip breaking movement between a drill member and a member to be drilled, said apparatus including a housing having laterally shiftable housing sections, means for locking said sections into any one of a number of relative adjusted positions thereof, one of said sections having a bore extending therethrough, a rotatable holder journalled in one end of said bore for holding one of said members, the other housing section closing off the other end of said bore and defining a space between said holder and said other housing section, a rotatable drive shaft journalled in said latter housing section, a coupling in said space for coupling the rotary movement of said shaft to said holder, a bore extending through said coupling, a tension spring in said bore anchored at one end to said holder and at the other end to said drive shaft, and means in said space for imparting an axial chip breaking motion to said holder comprising an annular bearing surface on the inner end of said holder, a bearing ring member engaging the end face of said latter housing section, and a bearing carrying cage sandwiched between said bearing surface and ring member, said cage having axially projecting bearings which ride in circular races in the opposing faces of said annular bearing surface and ring member, one of said races constituting an axial cam surface for reciprocating said holder, and said cage and said bearing ring member being shiftable laterally with respect to the axis of rotation of said drive shaft to maintain the cage and ring member coaxial of said holder for any one of a number of relative adjusted positions of the axes of rotation of said shaft and holder.

References Cited in the file of this patent

UNITED STATES PATENTS

| 2,365,128 | Wahl | Dec. 12, 1944 |
| 2,447,424 | Nightingale | Aug. 17, 1948 |
| 2,453,136 | Karweit | Nov. 9, 1948 |
| 2,645,952 | Bunnell | July 21, 1953 |